US006361616B1

(12) United States Patent
Rose

(10) Patent No.: US 6,361,616 B1
(45) Date of Patent: Mar. 26, 2002

(54) PIPELINE CLEANING METHOD AND APPARATUS

(75) Inventor: Michael Rose, Loughborough (GB)

(73) Assignee: Transco PLC, London (GB)

( * ) Notice: Subject to any disclaimer, the term of this patent is extended or adjusted under 35 U.S.C. 154(b) by 0 days.

(21) Appl. No.: 09/380,594

(22) PCT Filed: Mar. 10, 1998

(86) PCT No.: PCT/GB98/00525

§ 371 Date: Nov. 15, 1999

§ 102(e) Date: Nov. 15, 1999

(87) PCT Pub. No.: WO98/40174

PCT Pub. Date: Sep. 17, 1998

(30) Foreign Application Priority Data

Mar. 13, 1997 (GB) ............................................. 9705182

(51) Int. Cl.[7] ......................... B01D 45/00; B01D 46/00; B08B 5/04; B08B 9/04; B08B 9/027

(52) U.S. Cl. .............................. 134/8; 134/10; 134/21; 134/22.11; 134/22.12; 15/304; 55/337; 95/268

(58) Field of Search ................................ 134/8, 10, 21, 134/22.11, 22.12; 15/304; 55/323, 337, 487; 95/268, 287

(56) References Cited

U.S. PATENT DOCUMENTS

| | | | | |
|---|---|---|---|---|
| 2,767,138 A | * 10/1956 | Loeffler et al. | ............... | 210/16 |
| 5,472,514 A | * 12/1995 | Grimsley | ....................... | 134/8 |
| 5,529,605 A | * 6/1996 | Müssing et al. | .............. | 75/670 |

FOREIGN PATENT DOCUMENTS

| | | |
|---|---|---|
| DE | 3143031 A | * 5/1983 |
| EP | 563554 A | * 10/1993 |
| GB | 837 090 A | * 6/1960 |
| JP | 06254524 A | * 9/1994 |

* cited by examiner

*Primary Examiner*—Zeinab El-Arini
(74) *Attorney, Agent, or Firm*—Oblon, Spivak, McClelland, Maier & Neustadt, P.C.

(57) ABSTRACT

A method of cleaning a pipeline for transporting a fluid without interrupting the fluid flowing through the pipeline, including applying suction to remove a mixture of the fluid and debris from the pipeline, separating the debris from the fluid, and re-injecting the fluid separated from the debris into the pipeline.

20 Claims, 2 Drawing Sheets

PIPELINE CLEANING METHOD AND APPARATUS

The present application is a national stage application of the PCT application Ser. No. PCT/GB98/00525 filed Mar. 10, 1998, which claims priority to the Great Britain Patent Application No. 9705182.5 filed Mar. 13, 1997.

BACKGROUND OF THE INVENTION

The present invention relates to an improved method for cleaning a pipeline, in particular a gas main, and to an improved apparatus for carrying out the method.

DISCUSSION OF THE BACKGROUND

Gas mains can contain a substantial amount of debris, for example light dust through to heavy scale, or foreign bodies and other intruding material. This material needs to be removed in particular before any internal inspection or repair is carried out and because it reduces the carrying capacity of the main.

SUMMARY OF THE INVENTION

It is known to clean gas mains in a decommissioned state. but this has the disadvantage that the gas supply to the customers supplied by that main has to be interrupted while the cleaning is being carried out, thus causing inconvenience and difficulties to these customers.

It is an object of the present invention to provide a method of cleaning a pipeline, in particular a gas main in which the above disadvantages are reduced or substantially obviated. It is a further object of the present invention to provide an apparatuis for carrying out the cleaning method.

The present invention provides a method of cleaning a pipeline for transporting a fluid, in particular a gas, more particularly a gas which forms an explosive mixture when mixed with air, which method comprises removing debris from the pipeline by means of a collecting device and a removal unit, characterised in that the pipeline is cleaned in a commissioned state, without interrupting the flow of fluid through the pipeline, by removing a mixture of fluid and debris from the pipeline by means of suction, separating the debris from the fluid and re-injecting the cleaned fluid into the pipeline.

In particular, the present invention provides a method of cleaning a pipeline for transporting a fluid, in particular a gas, more particularly a gas which forms an explosive mixture when mixed with air, which method comprises the steps of (i) inserting into the pipeline to be cleaned a device for scraping the internal wall of the pipe and collecting the debris deposited by this scraping, together with loose debris in the pipe;

(ii) propelling the collecting device, together with the collected debris, along the pipeline to a collection point;

(iii) introducing a removal unit in the pipeline for location close to the collecting point and (iv) removing debris from the pipeline by means of this removal unit characterised in that the pipeline is cleaned in a commissioned state, without interrupting the flow of fluid through the-pipeline, and the removal unit comprises a suction head which is powered by a vacuum unit located in a cleaning unit, which cleaning unit is connected to the pipeline to be cleaned at a first point, close to the collection point for debris, and at a second point downstream (with respect to the direction of fluid flow) of the first point, and a mixture of gas and debris is removed by suction from the pipeline at the first point, passed through the cleaning unit, the debris is separated out from the gas/debris mixture as it is passed through the cleaning unit and the cleaned gas is returned to the pipeline at the second point.

In a preferred embodiment of the method according to the invention, the cleaning unit is provided, close to its first connection point. with an inlet for purging gas, and purging gas is supplied to the cleaning unit during the cleaning process.

The present invention further provides a cleaning unit for use in the pipeline cleaning method according to the invention, characterised in that the cleaning unit comprises, connected in series, first means for connecting the cleaning unit to the pipeline, first valve means, one or more separation stages for mechanical separation of debris from the gas/debris mixture, a blower for creating suction, second valve means connected in parallel with the blower, third valve means. a non-return valve, and second means for connecting the cleaning unit to the pipeline.

The cleaning unit according to the present invention preferably further comprises a plurality of sensors for measuring the pressure at a plurality of points in the cleaning unit, and control system for registering the output of the sensors, determining whether a hazard condition exists and taking appropriate action.

The control system is preferably designed to indicate where in the cleaning system, a hazard condition has originated. The control system is particularly preferably adapted to allow the cleaning system only to operate within pre-set system parameters.

The present invention further provides a trailer unit which comprises a cleaning unit mounted on a trailer, within a housing.

BRIEF DESCRIPTION OF THE DRAWINGS

A preferred embodiment of a method according to the invention, and a preferred embodiment of a cleaning unit according to the invention will now be described with reference to the accompanying drawings, in which.

DETAILED DESCRIPTION OF THE PREFERRED EMBODIMENTS

Figure 1:
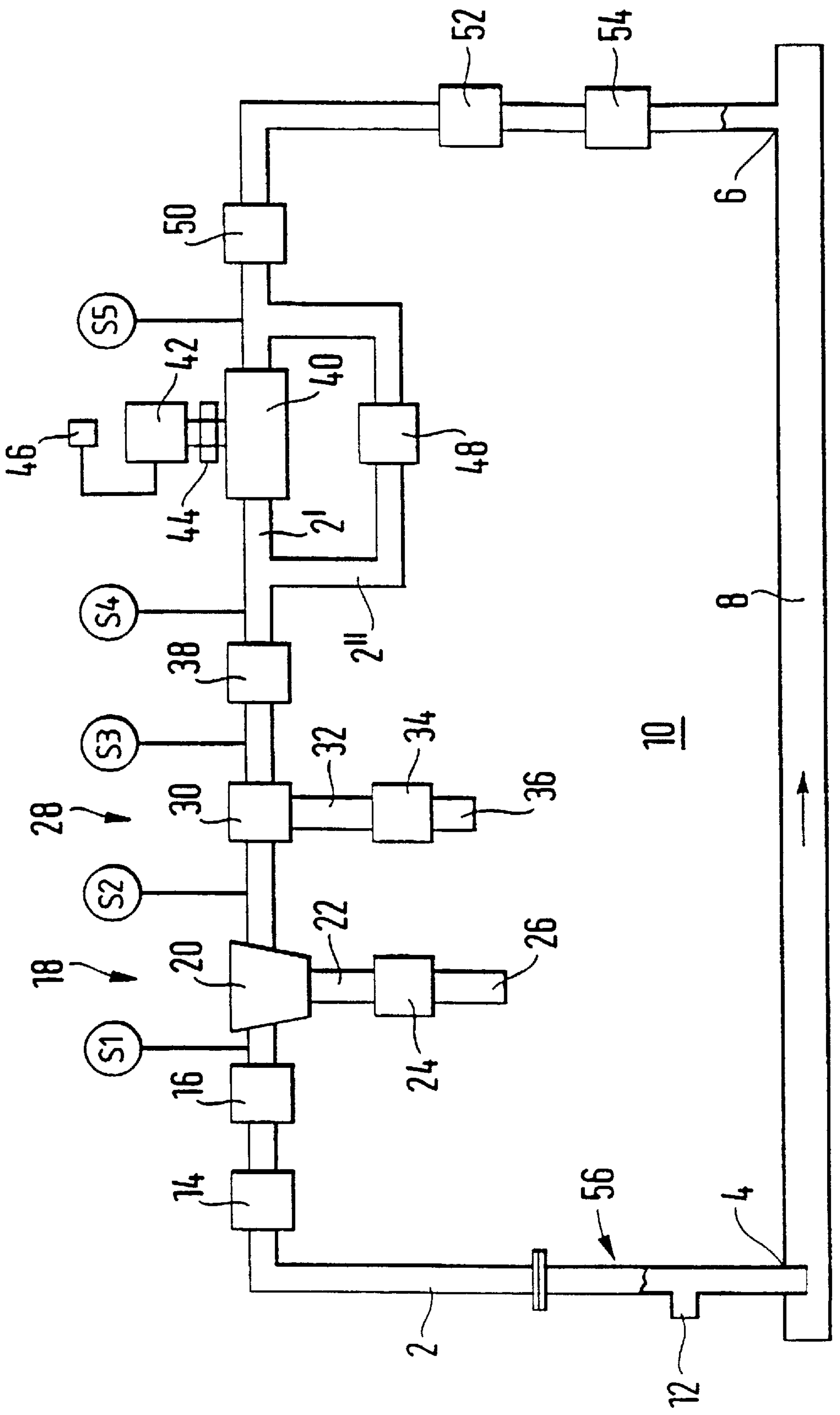
FIG. 1 is a schematic diagram, showing a preferred embodiment of a cleaning unit according to the invention, connected to a pipeline
Figure 2:
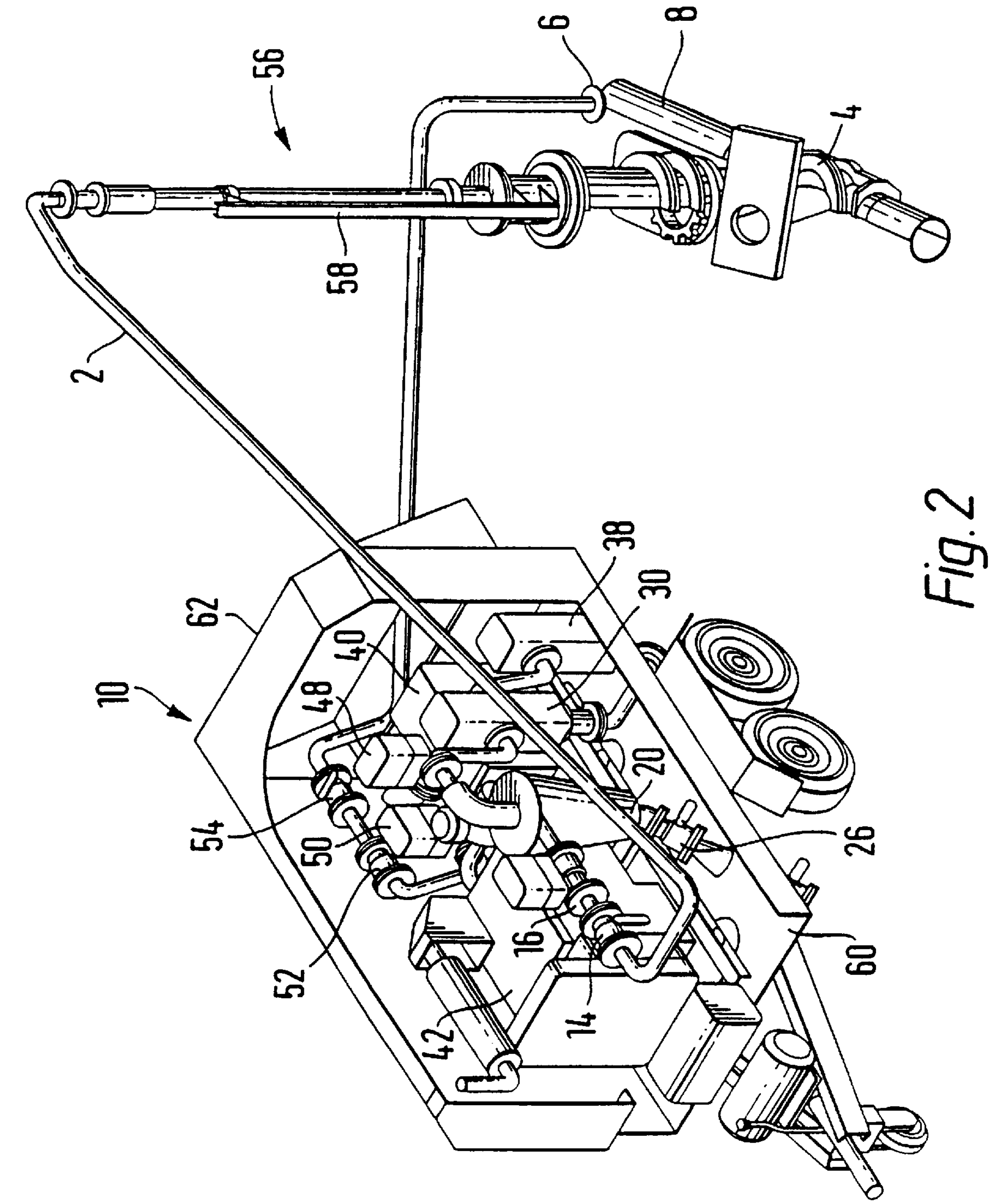
FIG. 2 is a perspective view of a cleaning unit according to the invention mounted in a housing unit on a trailer for transport, and connected to a gas main.

As can be seen from FIGS. 1 and 2, the cleaning unit shown generally at 10 comprises a pipe 2 detachably connected in a fluid tight manner at both a first access point 4 and a second access point 6 to a gas main 8. At access point 4 the pipe 2 may be insertable into the main 8 by a selectively variable amount. An openable and closable inlet 12 for purging gas is provided in the pipe 2 close to the point 4. A first manual valve 14 and first automatic valve 16, with pneumatic control, are provided in the pipe 2 downstream (with respect to the gas flow) of point 4. On the downstream side of the first automatic valve 16, a first separation stage 18 is located. This first separation stage 18 comprises a cyclone separator 20 connected by means of a manual valve 22 to a disposal chamber 24, which is vented to the atmosphere via a further manual valve 26. Opening the valve 22, periodically, allows separated debris to drop from the cyclone separator 20 into the chamber 24. Opening the valve 26, periodically, allows the debris to discharge from the chamber 24.

Downstream of the first separation stage 18, a second separation stage 28 is located. The second separation stage 28 comprises a filter 30 connected by means of a manual valve 32 to a disposal chamber 34 which receives separated debris when the valve 32 is opened periodically. The chamber 34 is vented to the atmosphere via a further manual valve 36 when opened periodically. The filter 30 is a coarse filter, which may be made of wire mesh.

Downstream of the second separation stage 28, a fine filter 38 is located. The filter 38 is a fine filter, which may be made of paper.

Downstream of the filter 38, the pipe 2 divides into two branches, a first branch 2' leading to a Roots blower 40. The blower 40 is driven by a diesel powered engine 42 to which it is connected by means of a safety coupling 44. Diesel fuel is supplied to the engine 42 by means of a fuel valve 46. The second branch 2" leads via a second automatic valve 48 back to the first branch 2', downstream of the blower 40. The function of the second automatic valve 48, which as will be explained later, is spring-loaded 'fail-open' is to protect the blower 40 from damage due to build-up of excess pressure downstream of the blower 40.

The pipe 2 then returns via a third automatic valve 50, a non-return valve 52 and a manual valve 54 to the second connection point 6 where it is connected to the gas main 8. The function of the non-return valve 52 is to ensure that the gas flow cannot reverse.

A plurality of sensors $S^1$ to $S^5$ are positioned along the pipe 2 to sense the pressure at the points where they ire connected. A first sensor $S^1$ is positioned betwveen the first automatic valve 16 and the first separation stage 18, a second sensor $S^2$ is positioned between the first separation stage 18 and the second separation stage 28, a third sensor $S^3$ is positioned between the second separation stage 28 and the filter 38 a fourth sensor $S^4$ is positioned between the filter 38 and the blower 40 and a fifth sensor $S^5$ is positioned between the blower 40 and the third automatic valve 50.

The sensors $S^1$ to $S^5$ are connected to a central control and monitoring unit (not shown).

As can be seen more clearly in FIG. 2, a suction head shown generally at 56 and mounted on an inner tube (not shown) is introduced into the gas main 8 at the first connection point 4. The inner tube on which the suction head 56 is mounted is controlled by means of a jack 58.

For ease of transport, the cleaning unit 10 is preferably mounted on a trailer 60 within a housing 62.

Preferably debris from a length of the main 8 between the access points 4 and 6 is scraped or otherwise suitably propelled by appropriate means towards the access point 4, whilst the main is live, so this debris is gathered at a single place in the main at or adjacent to the access point 4 for extraction by the suction head 56.

In operation, prior to start-up of the cleaning process, the first and second manual valves 14 and 54 are closed, as are the first and third automatic valves 16 and 50. The first and third automatic valves 16 and 50 are spring loaded 'fail-shut', i.e. in the closed position when the system is not in operation. The second automatic valve 48 is open when the system is not in operation and closed when it is in operation: i.e. it is spring loaded 'fail-open'.

As the cleaning process is started, the cleaning unit 10 is initially purged with gas which is injected into the pipe 2 via the inlet 12, so that the whole system is filled with gas and there is no air present.

The manual valves 14 and 54 are then opened and the control unit opens the automatic valves 16 and 50, the fuel valve 56 and shuts the automatic valve 48 and then the diesel engine 42 is started, to operate the blower 40. The engine 42 is hand-cranked, for safety reasons, as an electric starter might produce sparks which could ignite the gas. The fuel valve 46 is a solenoid operated valve which is linked to the control system, so that the control system can shut-down the diesel engine 42 in an emergency, by closing down the fuel supply to the engine.

While the cleaning system is in operation, the sensors $S^1$ to $S^5$ continually monitor the gas pressure to ensure that it is above atmospheric pressure and below a maximum set operating pressure, which is substantially equal to the pressure in the gas main. Any loss in pressure below atmospheric pressure or increase above the set operating pressure indicates to the control system that there is an emergency, caused for example by a blockage in the system and the control system shuts down the cleaning process.

In the event of an emergency, the following close down sequence is followed;

(i) the diesel supply to the diesel engine 42 is shut down;

(ii) the second automatic valve 48 is opened to bypass and thus protect the blower 40 by allowing gas pumped thereby to circulate through the pipe branch 21" and valve 48 and back to the blower to ensure there is no excessive pressure build-up whilst the system is in the process of shutting down;

(iii) after a set time, typically 5 seconds, the control system closes the first and third automatic valves 1 and 3 and the cleaning system stops operation.

By monitoring the outputs of the sensors $S^1$ to $S^{5,}$ the control system is able, in an emergency shut-down as described above, to indicate to the operator where the problem has arisen, which is helpful in achieving a more rapid solution to the problem.

The control system is further designed not to allow the cleaning system to operate outside of the system set parameters.

For example, the control system can be set to allow the cleaning system to operate with a maximum pressure differential across each of the filters 30,38, thus detecting when a filter is blocked or becoming blocked.

Either access point 4 or 6 may be specially drilled or may be a known access point normally provided to a gas main. The access points 4 and 6 are sealed after the cleaning procedure is completed and the pipe 2 is detached from the access points.

What is claimed is:

1. A method of cleaning a pipeline for transporting a fluid without interrupting the fluid flowing through the pipeline, comprising the steps of:

connecting a cleaning unit configured to separate debris from the fluid at first and second access points of the pipeline;

applying suction to remove a mixture of the fluid and the debris from the first access point of the pipeline;

separating the debris from the fluid; and re-injecting the fluid separated from the debris into the pipeline at the second access point.

2. A method according to claim 1, wherein the fluid is a gas.

3. A method according to claim 2, wherein the gas is a gas which forms an explosive mixture when mixed with air.

4. A method according to claim 3, wherein the debris is gathered from a length of the pipeline at a single place from which the debris is removed by said suction.

5. A method of cleaning a pipeline according to claim 3, further comprising the steps of:

inserting into the pipeline a device configured to scrape an internal wall of the pipeline and collecting debris deposited by scraping together with loose debris in the pipeline by a collecting device configured to collect the loose debris; and propelling the collecting device together with the debris collected along the pipeline to a collection point; wherein:

the applying, separating and re-injecting steps comprise introducing a removal unit into the pipeline for location close to the collecting point and removing debris from the pipeline by the removal unit; and the removal unit comprises a suction head which is provided by a vacuum unit located in a cleaning unit connected to the pipeline at a first connection point, close to the collection point for debris, and at a second connection point downstream of flow of the first connection point, and the mixture of the fluid and debris is removed by suction from the pipeline, passed through the cleaning unit, the debris is separated out from the fluid through the cleaning unit and the fluid cleaned is returned to the pipeline at the second connection point.

6. A method according to claim 2, wherein the debris is gathered from a length of the pipeline at a single place from which the debris is removed by said suction.

7. A method of cleaning a pipeline according to claim 2, further comprising the steps of:

inserting into the pipeline a device configured to scrape internal wall of the pipeline and collecting debris deposited by scraping together with loose debris in the pipeline by using a collecting device configured to collect the loose debris; and propelling the collecting device together with the debris collected along the pipeline to a collection point; wherein:

the applying, separating and re-injecting steps comprise introducing a removal unit into the pipeline for location close to the collecting point and removing the debris from the pipeline by the removal unit; and the removal unit comprises a suction head which is provided by a vacuum unit located in a cleaning unit connected to the pipeline at a first connection point, close to the collection point for debris, and at a second connection point downstream of flow of the first connection point, and the mixture of the fluid and debris is removed by suction from the pipeline, passed through the cleaning unit, the debris is separated out from the fluid through the cleaning unit and the fluid cleaned is returned to the pipeline at the second connection point.

8. A method according to claim 1, wherein the debris is gathered from a length of the pipeline at a single place from which the debris is removed by said suction.

9. A method of cleaning a pipeline according to claim 1, further comprising the steps of:

inserting into the pipeline a device configured to scrape an internal wall of the pipeline and collecting debris deposited by scraping together with loose debris in the pipeline by a collecting device configured to collect the loose debris; and propelling the collecting device together with the debris collected along the pipeline to a collection point; wherein:

the applying, separating and re-injecting steps comprise introducing a removal unit into the pipeline for location close to the collecting point and removing the debris from the pipeline by the removal unit; and the removal unit comprises a suction head which is powered by a vacuum unit located in a cleaning unit connected to the pipeline at a first connection point, close to the collection point for debris, and at a second connection point downstream of flow of the first connection point, and the mixture of the fluid and debris is removed by suction from the pipeline, passed through the cleaning unit, the debris is separated out from the fluid through the cleaning unit and the fluid cleaned is returned to the pipeline at the second connection point.

10. A method according to claim 9, wherein the cleaning unit is provided, close to the first connection point, with an inlet for purging gas, and the purging gas is supplied to the cleaning unit at a start of a cleaning process.

11. A cleaning unit for cleaning a pipeline, comprising:

first connecting means for connecting the cleaning unit to a first access point of the pipeline;

a first valve configured to open and close communication from the pipeline;

at least one separation stage configured to mechanically separate debris in a mixture of fluid and debris;

a blower configured to apply suction to remove the mixture of the fluid and the debris from the pipeline;

a second valve connected in parallel with the blower;

a third valve configured to open and close communication to the pipeline; and second connecting means for connecting the cleaning unit to a second access point of the pipeline.

12. A cleaning unit according to claim 11, further comprising a non-return valve positioned between the third valve and the second connecting means for connecting the cleaning unit to the pipeline.

13. A cleaning unit according to claim 11, wherein the at least one separation stage comprises a cyclone separator.

14. A cleaning unit according to claim 13, wherein said at least one separation stage comprises a second separation stage and the second separation stage comprises a coarse filter.

15. A cleaning unit according to claim 14, wherein the at least one separation stage comprises a third separation stage and the third separation stage comprises a fine filter.

16. A cleaning unit according to claim 11, further comprising:

a plurality of sensors configured to measure pressure at a plurality of points in the cleaning unit; and control means for registering a respective output of the sensors determining whether a hazard condition exists and taking an action.

17. A cleaning unit according to claim 16, wherein the control means further comprises means for indicating a location of a fault.

18. A cleaning unit according to claim 16, wherein the control means is set to ensure the the cleaning unit only operates within pre-set system parameters.

19. A cleaning unit according to claim 11, wherein said first connecting means for connecting the cleaning unit to the pipeline is connected in series with an inlet for purging gas connected in series with said first valve.

20. A trailer unit comprising a cleaning unit according to claim 11, wherein said cleaning unit is mounted on a trailer and disposed within a housing.

* * * * *